Figure 1:
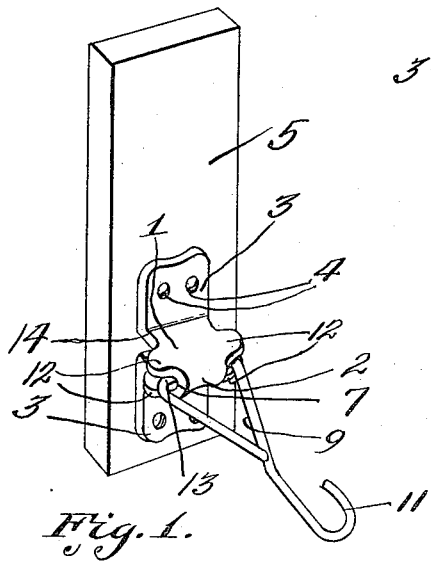

W. COOPER.
SUSPENSION DEVICE.
APPLICATION FILED OCT. 28, 1914.

1,154,845.

Patented Sept. 28, 1915.

Witnesses
Philip Terrell
Francis M. Boswell

Inventor
William Cooper
By D. Swift & Co.
his Attorneys

UNITED STATES PATENT OFFICE.

WILLIAM COOPER, OF HAMPTON SPRINGS, FLORIDA.

SUSPENSION DEVICE.

1,154,845.  Specification of Letters Patent.  Patented Sept. 28, 1915.

Application filed October 28, 1914. Serial No. 869,055.

*To all whom it may concern:*

Be it known that I, WILLIAM COOPER, a citizen of the United States, residing at Hampton Springs, in the county of Taylor and State of Florida, have invented a new and useful Suspension Device; and I do hereby declare the following to be a full, clear, and exact description of the invention, such as will enable others skilled in the art to which it appertains to make and use the same.

This invention relates to improved suspension devices adapted for use in connection with hammocks and the like.

As an object of the invention it is the aim to provide a device of this nature, in which the friction between the suspension hook and suspension eye or loop is reduced to a minimum, and especially the squeaking and rattling of the parts is entirely avoided, owing to the fact that the suspension eye or loop is provided with a horizontal bar which rocks or rides upon a convex surface of the suspension arch.

Another object of the invention is to provide means on the suspension arch to prevent movement of the suspension eye or loop in a direction at right angles to the usual movement of the suspension eye or loop, and at the same time to guide the suspension eye or loop in its riding or rocking movement upon the convex surface.

In practical fields the details of construction may necessitate alterations, falling within the scope of what is claimed.

The invention comprises further features and combination of parts, as hereinafter set forth, shown in the drawings and claimed.

Figure 2:
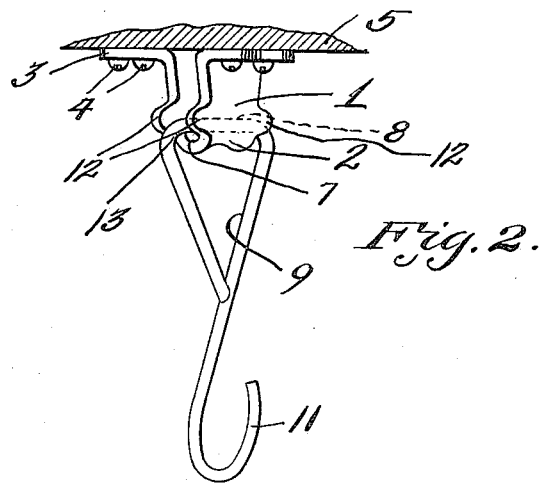
Figure 3:
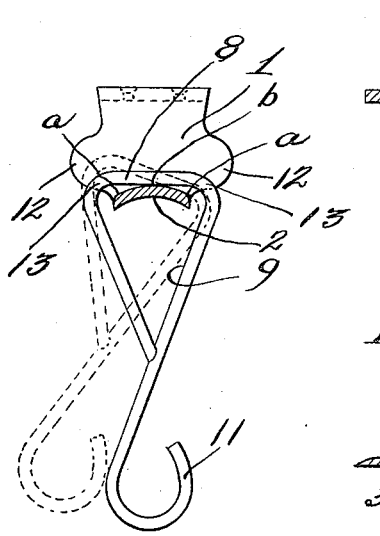
Figure 4:
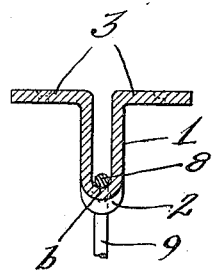
Figure 5:
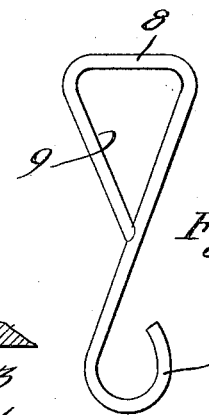
Figure 6:
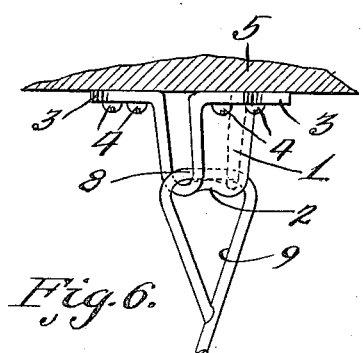

In the drawings:—Figure 1 is a view in perspective showing the suspension arch and eye and loop applied in use in connection with a hammock. Fig. 2 is a perspective view of the suspension arch and eye or loop as used in connection with a swing. Fig. 3 is a sectional view. Fig. 4 is a detail view of the suspension arch. Fig. 5 is a detail view of the suspension eye or loop. Fig. 6 is a view of another form of suspension arch and eye or loop.

Referring more particularly to the drawings, 1 designates a suspension arch, which comprises a sheet metal plate bent to form the arch portion 2 and the lateral ears 3, through which the screws or other securing devices 4 penetrate for securing the suspension arch to a stationary support 5. The arch portion proper, that is, the curved part 7, is convexed or curved upwardly toward the stationary support, as shown from $a$ to $b$, so as to provide a convexed bearing, on which the transverse bar 8 of the suspension eye or loop 9 may ride or rock, in such wise as to avoid squeaking and rattling, and at the same time reduce the friction to a minimum. The suspension eye or loop is constructed from a single piece of heavy wire, bent to form a hook 11 at one end, the other end of the heavy wire being soldered or otherwise connected to the body of the wire thereby forming a triangular shaped eye or loop, the horizontal bar of which rocks or rides upon the convexed bearing. The suspension arch is provided with lateral lugs 12 to overlie the sides 13 of the triangular shaped eye or loop to prevent lateral movement of the suspension eye. When the suspension arch and eye, which also includes the hook are used in connection with a hammock, the arch is designed to be bent as shown at 14, in order to conform to the inclination of the ends of the hammock and the hook, as shown in the drawings. When the suspension arch is used in connection with the spring, the same depends straight downwardly.

The invention having been set forth, what is claimed as new and useful is:—

A suspension device comprising an arch having opposite side portions provided with laterally extending ears designed to be secured to a support, the curve of the arch being convexed or curved upwardly from the ends of the arch to the center thereof and toward the support in a transverse direction of the arch, and a suspension eye or loop triangular in contour having a horizontal straight bar designed to rock or ride upon the convexed bearing surface, said arch having lateral lugs to engage the sides of the suspension eye or loop to prevent lateral swinging of the eye.

In testimony whereof I have signed my name to this specification in the presence of two subscribing witnesses.

WILLIAM COOPER.

Witnesses:
 J. D. BROWNE,
 B. F. SHEFFIELD.

Copies of this patent may be obtained for five cents each, by addressing the "Commissioner of Patents, Washington, D. C."